United States Patent [19]

Gilbert

[11] Patent Number: 5,530,896
[45] Date of Patent: Jun. 25, 1996

[54] APPLIANCE CONTROL PROCESS FOR MATCHING SLAVE UNITS TO CONTROL UNITS AND FOR AUTOMATICALLY ASSIGNING ADDRESSES TO THE SLAVE UNITS

[75] Inventor: Jérôme Gilbert, Levallois Perret, France

[73] Assignee: Euro CP s.a.r.l., L'Hay les Roses, France

[21] Appl. No.: 79,521

[22] Filed: Jun. 21, 1993

[30] Foreign Application Priority Data

Jun. 19, 1992 [EP] European Pat. Off. ............ 92-401717

[51] Int. Cl.⁶ ...................................................... G05F 1/00
[52] U.S. Cl. .................. 395/829; 395/284; 364/DIG. 1; 364/230.4; 364/242.96; 364/221; 364/492; 340/310.01; 340/825.07; 340/825.52
[58] Field of Search ........................ 340/825.06, 825.07, 340/825.52, 310.01, 310.06, 825.22, 825.25, 825.69, 825.72; 395/200, 275, 325, 725, 800, 200.1, 828, 829, 830, 284, 290, 490.01; 364/492, 550, 579; 307/38, 39

[56] References Cited

U.S. PATENT DOCUMENTS

| | | | |
|---|---|---|---|
| 3,623,013 | 11/1971 | Perkins et al. | 395/829 |
| 4,174,517 | 11/1979 | Mandel | 340/310.2 |
| 4,200,862 | 4/1980 | Campbell et al. | 340/310.1 |
| 4,418,333 | 11/1983 | Schwarzbach et al. | 340/310.1 |
| 4,545,013 | 10/1985 | Lyon et al. | 371/20.1 |
| 4,593,352 | 6/1986 | Castel et al. | 395/823 |
| 4,899,274 | 2/1990 | Hansen et al. | 395/200.1 |
| 4,910,658 | 3/1990 | Dudash et al. | 364/138 |
| 4,918,598 | 4/1990 | Ashkin et al. | 395/823 |
| 4,918,690 | 4/1990 | Markkula, Jr. et al. | 370/94 |
| 5,109,222 | 4/1992 | Welty | 340/825.72 |
| 5,109,484 | 4/1992 | Hughes et al. | 395/200.1 |
| 5,160,924 | 11/1992 | Jean-Pierre et al. | 340/825.52 |

FOREIGN PATENT DOCUMENTS

| | | |
|---|---|---|
| 0203668 | 12/1986 | European Pat. Off. . |
| 0315158 | 5/1989 | European Pat. Off. . |
| 0466151 | 1/1992 | European Pat. Off. . |
| 2337478 | 7/1977 | France . |
| 2128367 | 4/1984 | United Kingdom . |
| WO90/07239 | 6/1990 | WIPO . |
| WO91/14213 | 9/1991 | WIPO . |

OTHER PUBLICATIONS

"Introduction to names, addresses and routes in an OSI environment", Computer Communications, vol. 13, No. 1, Jan./Feb. 1990, By A. Patel et al, pp. 27–36.

Headtkit, Mail Order Catalog No. 206 (Spring 1987), pp. 22–23.

X–10 Inc., CP290 Home Control Interface With Software for IBM™ and Compatibles, Owner's Manual (1987), pp. 9, 13, 25, 26, 32.

Primary Examiner—Thomas C. Lee
Assistant Examiner—Lance Leonard Barry
Attorney, Agent, or Firm—Young & Thompson

[57] ABSTRACT

An automatic determination of an address suitable for a functional unit connected to other similar functional units via a bidirectional communication network. A field of possible addresses are scanned and a status request is transmitted for each address. In response to the request, if an answer is received, this means the address is already allocated, the address is incremented and the process is restarted. If no answer is received, then a second test is performed on the same address. If there is still no answer, meaning the address is available and not taken by another functional unit, the address is adopted.

8 Claims, 6 Drawing Sheets

FIG_1

FIG_4

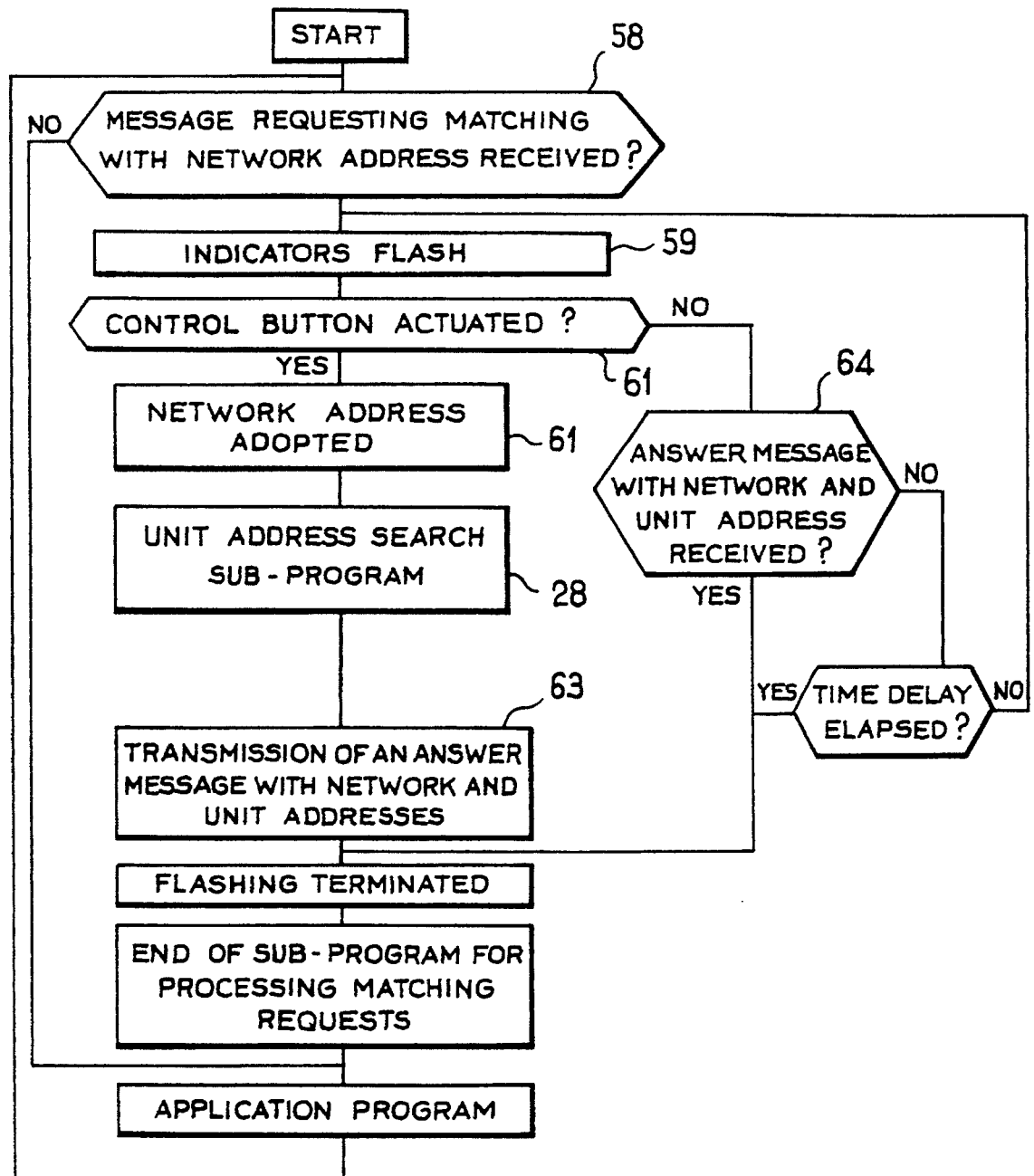
FIG_8

APPLIANCE CONTROL PROCESS FOR MATCHING SLAVE UNITS TO CONTROL UNITS AND FOR AUTOMATICALLY ASSIGNING ADDRESSES TO THE SLAVE UNITS

BACKGROUND OF THE INVENTION

1. Field of the Invention

The present invention relates to a process for addressing a functional unit connected to other functional units via a bidirectional communication space within a dwelling.

The present invention also relates to a process for matching two such functional units via a communication space.

The present invention also relates to a functional unit and an installation for implementing these processes.

2. Summary of the Invention

The present invention is applicable to home installations and to installations in trade premises.

In such installations it is known how to organize functional units by connecting them together via a communication space so as to afford the user control which is more advanced, more automated or more convenient.

The invention is implemented using functional units for example, appliances or appliance functions which are capable of bidirectional communication. The transmission medium or media used to create the bidirectional communication space can be carrier currents, a cable, fiber-optic or radio-frequency means, etc . . . . The functional units need not only be appliances, but can also be functions or facilities of the appliance, or also a unit providing a relay function for an appliance at a distance from the dwelling.

The structure of the most suitable network for implementing this process is a multi-master, multi-slave structure with possible role swapping. The method of accessing the transmission medium will be advantageously of a multiple access type with listening and collision management.

This type of installation comprises operational phases where addresses must be allocated to each of the functional units. For example, when an operator configures an installation: he must designate functional units which have to communicate with each other, i.e., in order that this is stored, which working functional unit will have to respond to a given command, originating from a control unit, for example a timer or a control box provided with manual buttons.

The aim of the invention is to replace the manual addressing processes, which generally require specific abilities and a technical bent, by a process which can be completely automated.

According to the invention, the process of addressing a functional unit in a bidirectional communication space linking several such functional units together, is characterized by the following stages:
a) transmission in the communication space, by the functional unit, of an interrogation message provided with a first address chosen from the field of possible addresses;
b) waiting by the functional unit for an answer to this interrogation message originating from the communication space;
c) adoption of the first address by the functional unit in the absence of an answer to the interrogation message;
d) in the presence of an answer to the interrogation message, repeat stages "a)" and "b)" by the functional unit changing the address associated with the interrogation message until the $n^{th}$ interrogation message, provided with an $n^{th}$ address, remains unanswered;
e) adoption of the $n^{th}$ address by the functional unit.

The functional unit systematically scans a field of possible addresses. For each address it asks a question, sending the question to any functional unit which would already have the scanned address. If there is no answer, the scanned address is available and the functional unit adopts this address. If on the other hand there is an answer, the scanned address is already allocated to another functional unit and the functional unit in the process of addressing asks its question again associating a new address with it which in its turn is scanned in this way. And so on, until an available address is detected by the absence of an answer to the question posted to this address.

This process is completely automated, to the point where the operator can completely ignore the address retained and the number of addresses scanned without success before an address can be retained. It is sufficient for the operator to trigger the process of searching for the address by activating a control in an appropriate manner, unless this triggering is itself automatic, if the addressing process is part of a larger process.

According to a second aspect of the invention, a larger process may consist of a process of matching functional units linked together via a bidirectional communication space, characterized by the following stages:
designation by an operator of a control functional unit and a working functional unit,
automatic addressing of the working unit;
transmission by the working unit of a message which includes the address of the working unit,
recording of the address of one of the working units in the non-volatile memory of the other control unit.

This process allows a control unit to be matched with a working unit so that the working unit can be subsequently controlled by means of the control unit.

It is possible to automate it to the point where only its designation stage of the two units requires the intervention of an operator.

According to a third aspect of the invention, the functional unit is characterized in that it comprises a microcontroller programmed according to the process of the first aspect of the invention, and to which are connected the input/output means and a means of bidirectional transmission to link the microcontroller to a bidirectional communication space.

According to a fourth aspect, the invention also encompasses an installation constituted by such functional units linked together by a bidirectional communication space.

Other features and advantages of the invention will also be apparent from the following description, reference being made to the non-limitative examples.

BRIEF DESCRIPTION OF THE DRAWINGS

In the attached diagrams:

FIG. 8 is a flow chart of matching according to which the microcontroller of the working appliance is programmed.

DESCRIPTION OF THE PREFERRED EMBODIMENTS

Figure 1:
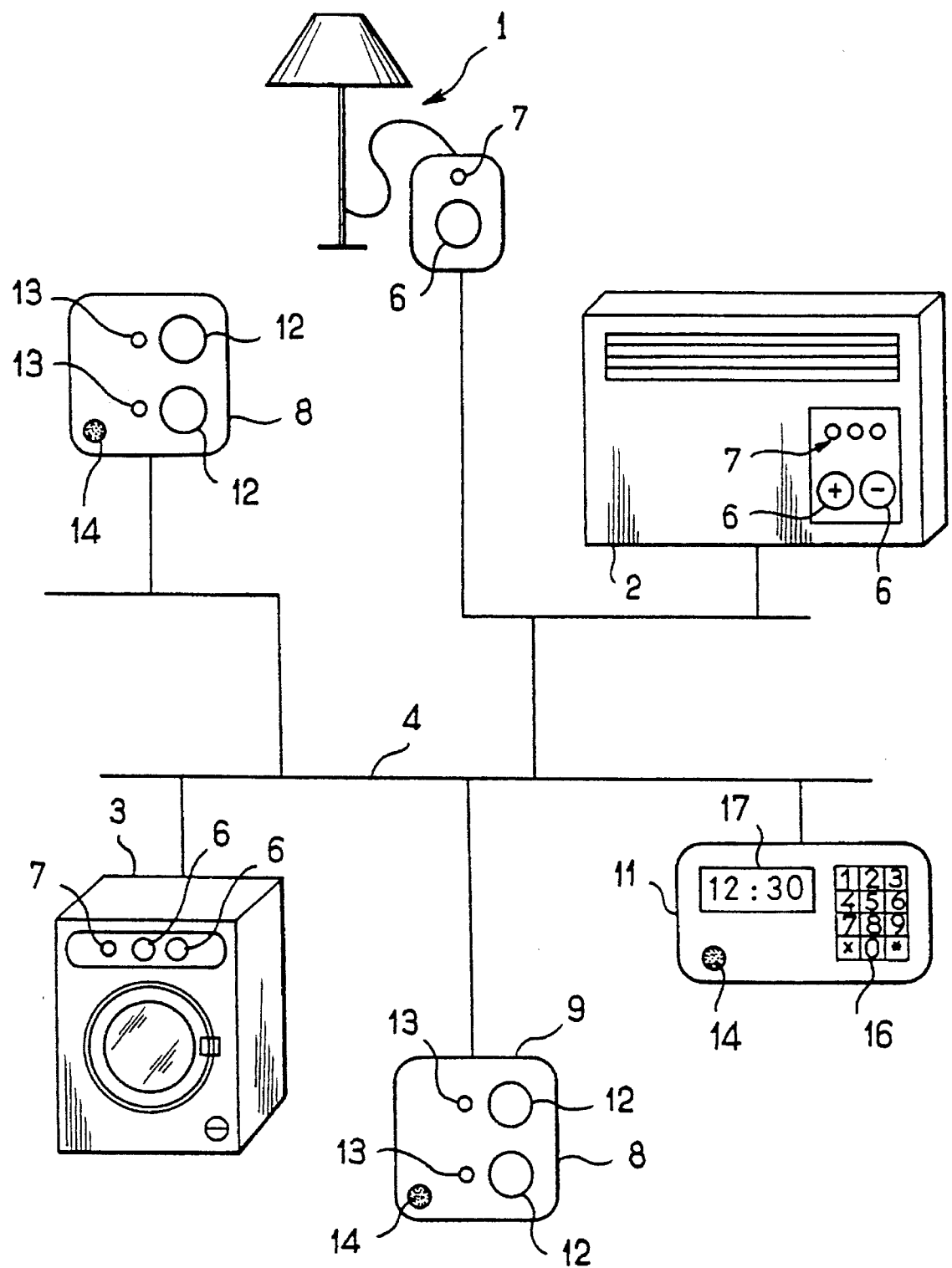
FIG. 1 is a schematic view of an installation according to the invention.

In the example shown in FIG. 1, the installation, which has been intentionally simplified, comprises various working appliances, namely a standard lamp 1, a convector heater 2, and a washing machine 3 which are connected to each other via a bidirectional communication space 4 through which they can exchange status messages originating from the working appliances 1 to 3 and control messages intended for the working appliances 1 to 3. The working appliances 1 to 3 contain one or more adjusting buttons 6 offering a minimum of two operating states, for example "on" and "off", and one or more indicator lamps or other indicators 7.

The space 4 may be constituted by the electricity supply circuit, in which case the messages are processed in a concrete fashion using carrier current techniques. The space 4 may also be constituted by a space which is permeable to radio waves or infrared signals, or by a hardwired means of transmission.

Three control appliances 8, 9, 11 are also linked to the space 4 to receive the status messages from the working appliances 1 to 3, and to send them control messages and status request messages.

The control appliances 8 and 9 are of manual type. They comprise two remote control buttons 12 with an indicator lamp 13 associated to each. They also include a manual control for requesting matching 14.

The control appliance 11 is a timer comprising a programming keypad 16, a button for requesting matching 14 and a clock 17.

Figure 2:
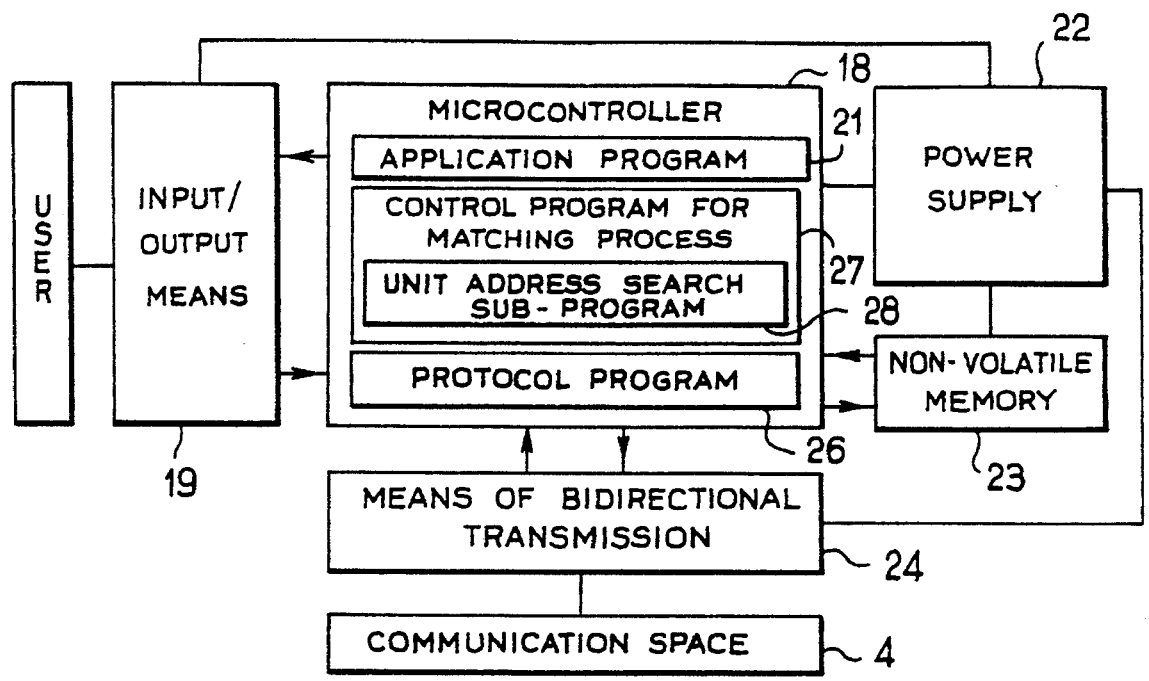
FIG. 2 is a block diagram of a control appliance.

As is shown in FIG. 2, each working appliance comprises a microcontroller 18 connected to the input/output means 19 which provide the interface with the user. In practice, these input/output means are constituted by the buttons 6 and indicator lamps 7 of the appliance, and also by the operating gear of the working appliance which supply the user with the expected action, for example lighting, heating etc.

As a function of the commands executed by pressing the buttons 6 and, if appropriate, the signals received from sensors, an application program 21 provided in the microcontroller manages the action of the indicator lamps 7 and the operating gear (lamps, motors, heating resistors, relays etc.) being part of the input/output means. In addition the microcontroller 18 is connected to a power supply 22 and to a non-volatile memory 23. The microcontoller 18 is also connected to the space 4 via a bidirectional transmission means 24, for example, a modem capable of converting the information received from the microcontroller 18 into a message of carrier current type, and inversely to convert the messages of carrier current type originating from the space 4 into signals which can be accepted by the microcontroller 18.

The microcontroller 18 also includes a control program for the matching process 27, comprising a unit address search sub-program 28.

A protocol program 26 is also provided in the microcontroller 18 which manages the exchange of information between the bidirectional transmission means, the input/output means and the non-volatile memory.

Figure 3:
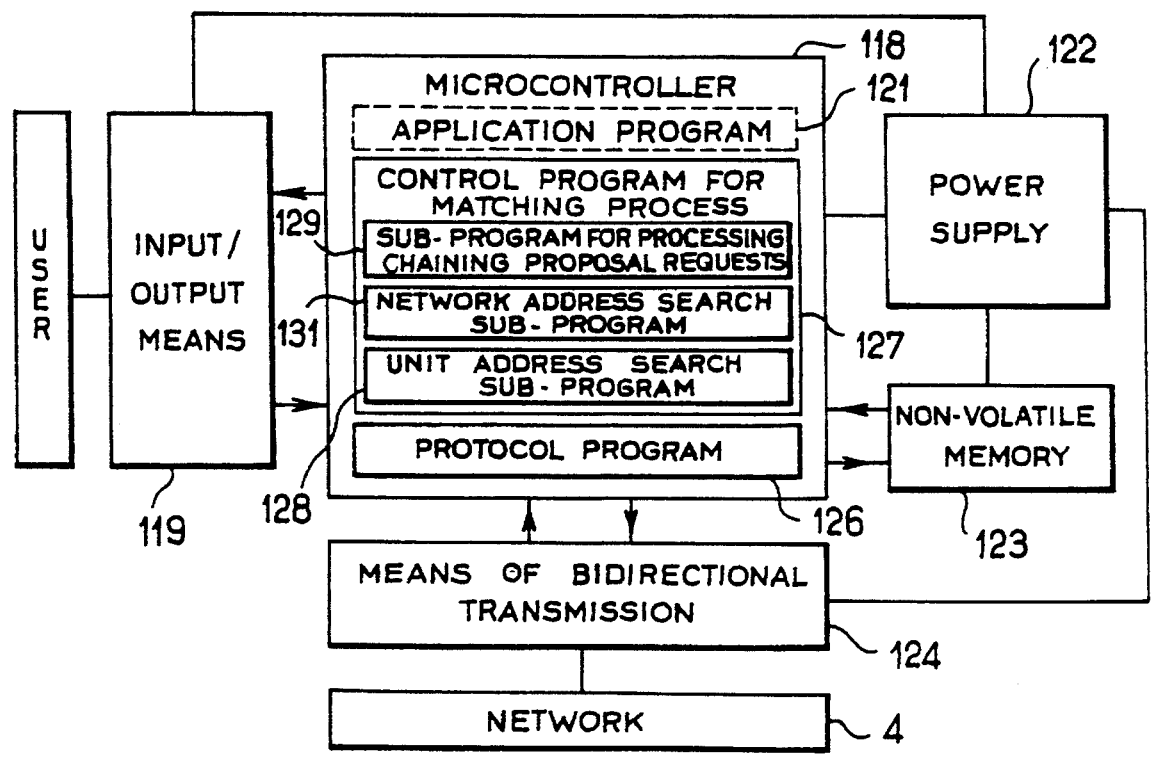
FIG. 3 is a block diagram of a working appliance.

As is shown in FIG. 3 the block diagram of the control appliances 8, 9, 11 only differs from that of the working appliances 1 to 3 in that in the microcontroller 118 the application program 121 is no more than optional whilst the process management program 127 includes, in addition to the unit address search sub-program, a chaining proposal request processing sub-program 129 and a network address search subprogram 131.

Furthermore, the diagram is identical to that of FIG. 2, the numerical references of the corresponding elements being increased by 100.

The application program 121 may only be provided in certain types of control appliances, for example, the timer 11 for its own automatic operation.

The input/output means 119 of the control appliances comprise the remote control buttons 12, the matching request button(s) 14 and the indicator lamps 13.

The matching process according to the invention is started by the user pressing the matching button 14 of a control appliance, for example, the control appliance 8 in FIG. 1. On all the control appliances 8, 9, 11 this button is the same color, for example, blue, whatever the appliance and whoever the manufacturer so that the user may easily identify it. Moreover, it is hidden during normal use or sufficiently difficult to access so that accidental operation is avoided. The operator presses the matching request button 14 of the control appliance 8 on which the control 12, which the user wishes to match with the working appliance 1 to 3, is to be found.

Figure 4:
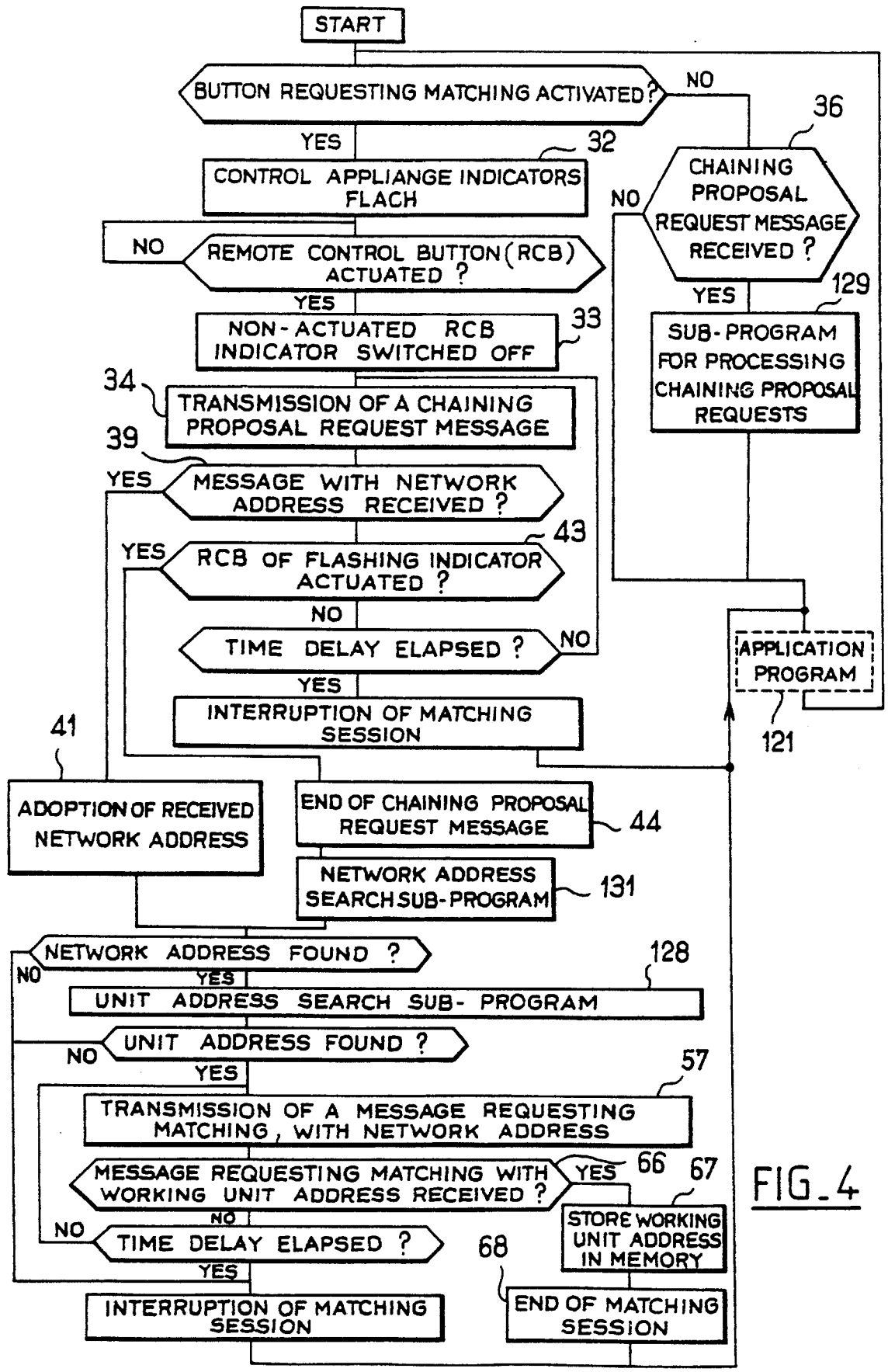
FIG. 4 is a flow chart of matching according to which the microcontoller of the control appliance is programmed.

FIG. 4 shows the flow chart of the matching process as programmed in the control appliance 8.

Pressing the matching request button causes the local indicators 13 allocated to the different buttons of the remote control (RCB) 12 of the control appliance to flash (stage 32).

The flashing of all the indicators of the control appliance is intended to prompt the user to designate the remote control button to match with the working appliance. When the user has chosen one of the remote control buttons 12, the indicator 13 linked to the non-retained RCB 12 goes out (stage 33) and a chaining proposal request message is transmitted (stage 34).

In fact at this stage the actuated remote control button 12 does not yet have an address and in the subsequent part of the process it will be allocated two addresses, namely, on the one hand, a network address which will be common to the functional unit selected by the remote control button 12 and the associated indicator 13, and to all the control or working functional units with which the remote control button 12 will have to be able to communicate, and on the other hand, a unit address which in contrast will be specific to the functional unit determined by the remote control button 12 and the associated indicator 13, and must not therefore be attributed to any other functional unit.

By the word "chaining" is meant a process which allows a given functional unit to be assigned the same network address as another functional unit without the operator knowing this network address.

Figure 7:
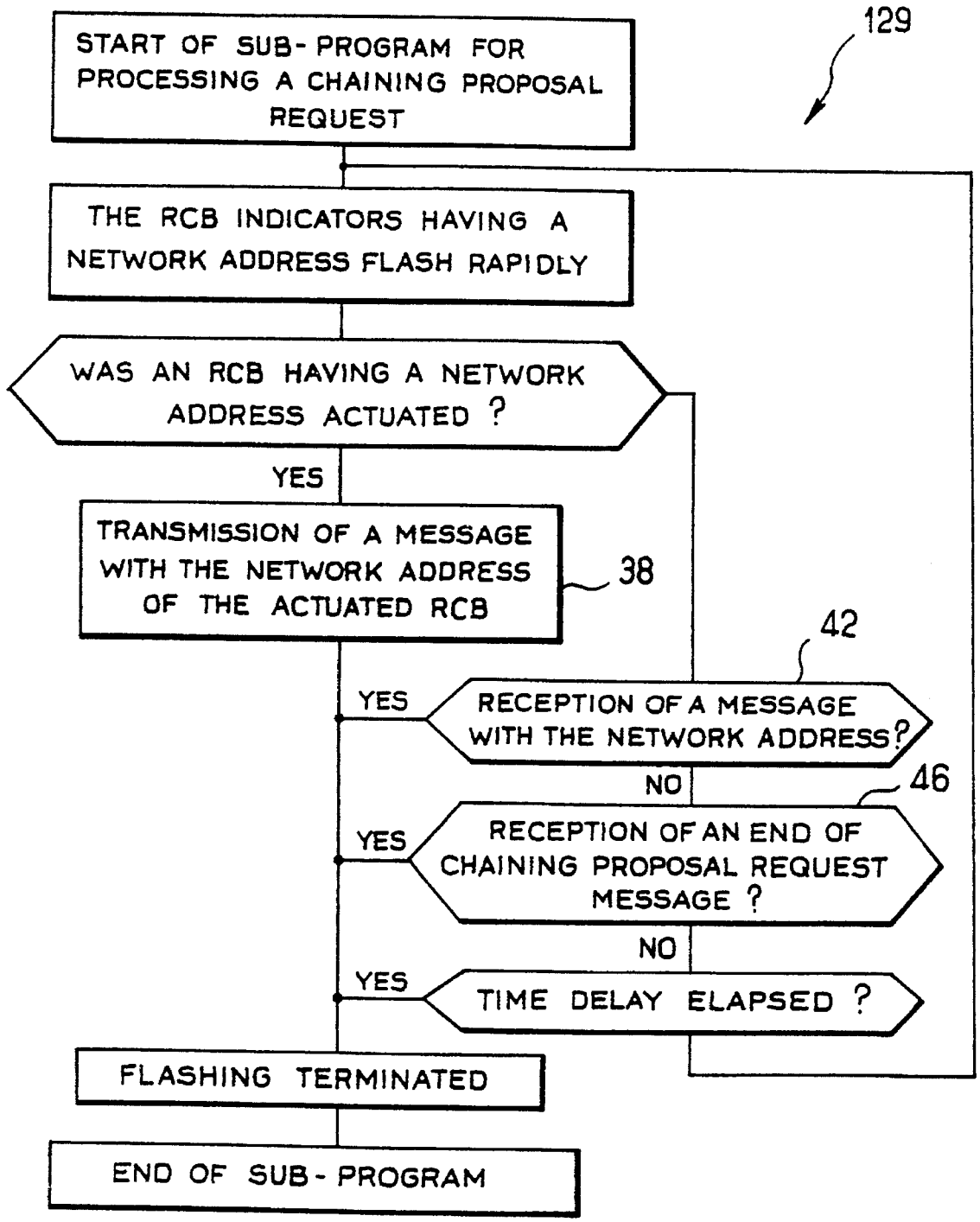
FIG. 7 is a flow chart of the chaining proposals request processing sub-program.

The chaining proposal request message transmitted according to stage 34 is received by the other control functional units connected to the communication space (test 36 in FIG. 4) and the chaining proposal request is processed by sub-program 129 which will be described with reference to FIG. 7.

When a control functional unit receives a chaining proposal request message, the indicators 13 of the remote control buttons 12 already having a network address start flashing rapidly, in contrast to the slower flashing of indicator 13 associated with the remote control button 12 which initiated the matching session.

This rapid flashing prompts the operator to choose, as a matter of priority, if this is convenient, the option consisting of actuating one of the remote control buttons, the indicator of which flashes rapidly. If the operator does this, the functional unit of the remote control whose button has just been actuated transmits (stage 38) a message with the network address of the remote control button which has been actuated.

Returning to FIG. 4, this message is detected by test 39 of the remote control button which initiated the matching session. With the result that the remote control button 12 which initiated the matching session adopts (stage 41) the network address received.

In contrast, returning to FIG. 7, if in a working functional unit other than that which initiated the session no remote control button is actuated, the functional unit awaits reception of a message with the network address (test 42). Such a message may originate from a third functional unit, the remote control button of which has been actuated so as to produce chaining from this third functional unit. If a message is transmitted from the functional unit considered in FIG. 7 or a message is transmitted from a similar functional unit detected by test 42, the functional unit considered in FIG. 7 stops the indicator lamps flashing and that ends the execution of the sub-program for processing chaining proposal requests.

Figure 5:
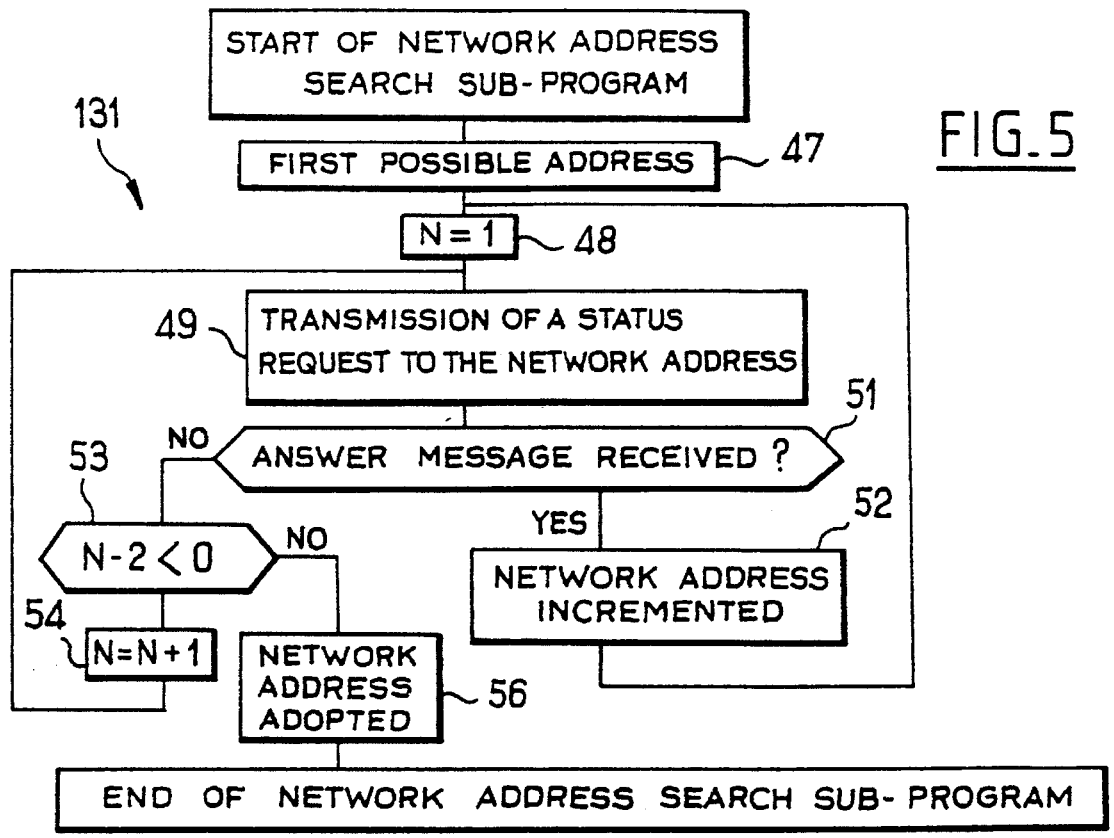
FIG. 5 is a flow chart of the network address search sub-program.

But it is also possible that the operator wishes not to produce chaining but on the contrary, a new network independent of those which already exist. In this case, the operator instead of actuating a remote control button of a functional unit other than that which initiated the session, actuates the remote control button which initiated the session for a second time, and this is detected by test 43 in FIG. 4, and causes the transmission (stage 44) of a message to end the chaining proposal request. Such a message is detected by sub-program 129 (FIG. 7) of the other working functional units (test 46) and causes, in these as well, the indicators of the other working functional units to stop flashing and ends the execution of their sub-program for processing chaining proposal requests. In the functional unit that initiated the session, stage 44 is followed by the execution of the network address search sub-program 131, which will be described with reference to FIG. 5.

This sub-program scans the possible address field of the network. At the beginning, initialization is carried out on the first address (stage 47), then a number N is set to 1 (stage 48). The number N allows one to know whether each address has been scanned once or twice.

Next, stage 49, the sub-program causes the transmission of a status request to the network address being scanned, and, stage 51, waits for a possible answer message. If an answer is received the network address is not available and the program increments the scanned address, so as to then scan the next address (stage 52), then N is set to 1 again (stage 48 already described) and the transmission of a status request recommences with the new address and so on.

If on the other hand no answer message is received following the transmission of a status request for a given network address, one determines with test 53 whether it is the first or second scan of this address. If it is only the first scan, N is set to 2 (stage 54) then a new status request with the same network address is issued.

If on the other hand N is equal to 2, in other words, if the network address has been scanned twice without obtaining an answer message, it is considered that the address is available and it is adopted, stage 56. The network address search sub-program is then terminated.

Figure 6:
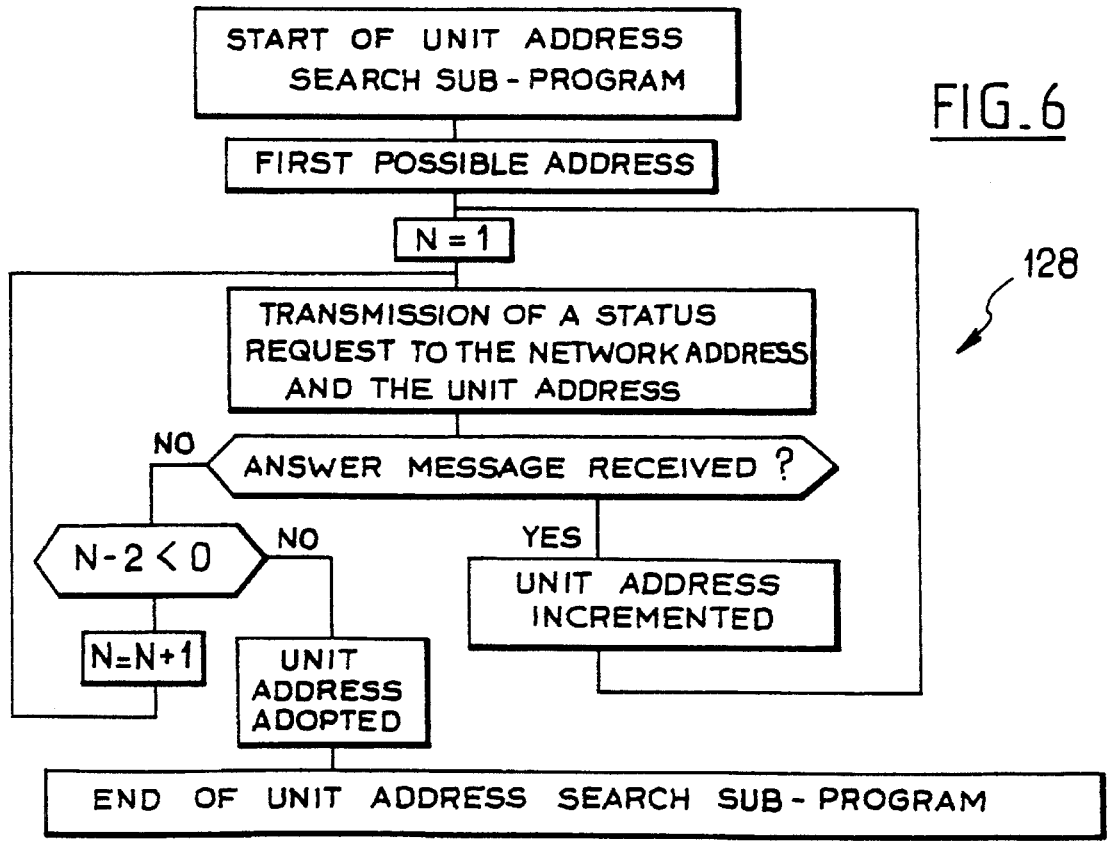
FIG. 6 is a flow chart of the unit address search sub-program.

The working functional unit then moves on to the unit address search sub-program 128 which will be described with reference to FIG. 6. This sub-program is identical to the network address search sub-program except that the status requests not only contain the unit address which one wishes to test but also the network address which is now known. In fact there would be no drawback in choosing a unit address for the working functional unit which is already allocated to another functional unit which is part of a different network and thus has a different network address.

The control functional unit is now in a completely addressed state and, (stage 57, FIG. 4), the functional unit which has initiated the session transmits a message requesting matching stating the network address and optionally stating a restrictive criterion, signifying for example "lamps", so that only lighting appliances respond to the message requesting matching.

The message requesting matching is received by the working functional units (test 58, FIG. 8) having the same network address, and all the working functional units having this same network address and which, if appropriate, satisfy the restrictive criterion, flash their indicator lamps (stage 59) to prompt the operator to match with the working functional unit. The operator can do this by actuating any control button of the working unit, and this will be detected by test 61, in which case the working functional unit, if it does not already have the network address, adopts the network address which is sent to it by the control functional unit, stage 62.

Next, the working functional unit runs its unit address search sub-program 28 which is similar to the unit address search sub-program 128 described with reference to FIG. 6 and will not therefore be described again.

In a way which is not represented, if the working functional unit already has a network address and a unit address it compares its network address to that sent by the control unit. If they are not identical, the working unit adopts the network address sent by the control unit and searches for a new unit address with sub-program 28. If they are identical, the working unit starts the unit address search with the unit address that it already has, so as to check whether it is still available. Only if the result is negative will the rest of the address field be systematically scanned.

Next, whatever the method by which the working functional unit acquires addresses, it transmits an answer message containing its network and unit addresses (stage 63) and stops flashing its indicators.

Normally, if the operator does not actuate a control button on the working functional unit considered in FIG. 8, he will do it on another working functional unit similar to that of FIG. 8 and the answer message transmitted by this other working functional unit is detected by the unit in FIG. 8 by means of test 64, which also causes the end of flashing and the termination of the sub-program for processing requests for matching.

The answer message with network and unit addresses is also detected by test 66 (FIG. 4) of the control functional unit, and the complete address of the working unit is stored in memory (stage 67), then the matching session is terminated (stage 68).

Termination of the matching session in the control and working functional units causes the resetting of all the buttons and indicators to their normal operating function. As the control functional unit has stored in memory the address of the working appliance with which it was matched, it will be possible to use actuating the remote control button 12, for example, to start and stop the working appliance with which the remote control button was matched.

It is understood that the invention is not limited to the examples described and represented.

One could start by designating the working appliance with which one wishes to match the remote control button, then carry out the automatic searches for addresses next.

Instead of storing the address of the designated working appliance in the memory of the control unit, a so-called "subset" address can be integrated in the message requesting matching transmitted by the control unit which the designated working unit will store in memory. After termination of matching, the working unit will respond to any command containing this subset address.

I claim:

1. A process for matching a plurality of functional units connected together via a bidirectional communication space, each of said plurality of functional units being provided with remote control means and indicating means, some of said plurality of functional units being provided with matching means, said process comprising:

a) designation by an operator of a control functional unit by actuating matching means of said control functional unit;

b) activation of said indicating means to prompt said operator to match said control functional unit with a working functional unit;

c) designation, by said operator, of said working functional unit by actuating said remote control means of said working functional unit;

d) automatic addressing of said designated working functional unit;

(e) transmission, by said designated working functional unit, of a message which includes an address of said working functional unit; and f) storage of said address in a non-volatile memory of said control functional unit.

2. The process according to claim 1, wherein said address stored in step f) is allocated to said working functional unit in said automatic addressing step d).

3. The process according to claim 1, wherein said address stored in step f) is a subset address stored by said working functional unit after having received a message originating from said control functional unit.

4. The process according to claim 1, wherein said designation step c) further comprises the steps of:

designation, by said operator, of a first control functional unit by actuating remote control means of said first control functional unit;

transmission of a designation request message by said first control functional unit, said designation request message comprising at least one restrictive criterion;

activation of said indication means, by other working functional units which satisfy said at least one restrictive criterion, to make their presence known to said operator;

designation by said operator of a second working functional unit from among those which have made their presence known by said activation of said indication means.

5. The process according to claim 1, wherein before said automatic addressing step d), a test is conducted to see if a network address communicated by said control functional unit corresponds to said network address stored in a memory of said working functional unit and, if a result of said test is negative, then the network address communicated by said control functional unit is adopted for said working functional unit, and said automatic addressing of step d) proceeds, while if said network address communicated by said control functional unit is identical to said network address stored in said memory of said working functional unit, then said automatic addressing of step d) begins with a check on an availability of a unit address that has been previously stored by said working functional unit.

6. The process according to claim 1, wherein said operator chooses between giving a network address which is already allocated to said first control functional unit and to said working functional unit, to allow said first control functional unit to communicate with other functional units, or initiating an automatic addressing process to give said first control functional unit a new network address;

communicating said network address of said first control functional unit to said second working functional unit, so that said second functional unit uses said same network address as said first control functional unit;

automatic addressing of said working functional unit in order to give a unit address to said working functional unit.

7. The process according to claim 6, wherein the following steps allocate a network address which is already allocated to other functional units to said first control functional unit:

initiation, by said first control functional unit, of a chaining proposal request via said bidirectional communication space;

activation of said indication means by other functional units already possessing a network address to make their presence known to said operator;

designation, by said operator, of at least one functional unit whose indication means are activated;

sending, by said designated functional unit, of a message including a network address of said designated functional unit via said bidirectional communication space;

reception of said message sent by said designated functional unit by said first control functional unit and adoption of said network address received in said message sent by said designated functional unit including said network address, by said first control functional unit.

8. The process according to claim 1, further comprising an automatic addressing step to allocate a unit address to said control functional unit.

* * * * *